United States Patent [19]

Yamamoto

[11] Patent Number: 5,123,961
[45] Date of Patent: Jun. 23, 1992

[54] SOLID INK

[75] Inventor: Masaharu Yamamoto, Inazawa, Japan

[73] Assignee: Brother Kogyo Kabushiki Kaisha, Aichi, Japan

[21] Appl. No.: 668,761

[22] Filed: Mar. 13, 1991

[30] Foreign Application Priority Data

Mar. 15, 1990 [JP] Japan .................................. 2-65440

[51] Int. Cl.⁵ .............................................. C09D 11/12
[52] U.S. Cl. ........................................ 106/31; 106/272
[58] Field of Search ................................. 106/31, 272

[56] References Cited

U.S. PATENT DOCUMENTS

| | | | |
|---|---|---|---|
| 3,186,856 | 6/1965 | Leutzinger | 106/31 |
| 3,778,288 | 12/1973 | Ridge et al. | 106/272 |
| 4,175,977 | 11/1979 | Heaton et al. | 106/272 |
| 4,525,214 | 6/1985 | Panken . | |
| 4,741,774 | 5/1988 | Lazar . | |
| 4,851,045 | 7/1989 | Taniguchi | 106/31 |

*Primary Examiner*—Karl Group
*Assistant Examiner*—Helene Klemanski
*Attorney, Agent, or Firm*—Kane, Dalsimer, Sullivan, Kurucz, Levy, Eisele and Richard

[57] ABSTRACT

A solid ink for use in a hot-melt ink jet printer of the present invention comprises: a central body including wax and one of dye and pigment; and a layer of wax formed on at least one surface of the central body. The wax layer is preferably formed on all the surfaces of the central body.

5 Claims, 4 Drawing Sheets

SOLID INK

BACKGROUND OF THE INVENTION

The present invention relates to a solid ink for use in a hot-melt ink jet printer.

Solid ink for use in hot-melt ink jet printers has been a solid mixture of wax and a pigment or dye. In printing operation, the solid ink is melted with heat so that it is fluidized and can be ejected as an ink jet.

When the hot-melt ink jet printer is to be supplied with solid ink, a cartridge of solid ink contained in a container or a bare solid ink body is put into the ink jet printer. The cartridge of solid ink is disadvantageous and finds less usage in actual applications for the following reasons: The cartridge of solid ink is relatively expensive because of the container used. In addition, the ink jet printer is required to have a complex mechanism for heating the solid ink in the cartridge into a fluidized state and a complex mechanism for detecting the remainder of the solid ink.

In view of the above shortcomings of the cartridge-type solid ink, more and more solid ink is supplied in the form of bare solid ink bodies because they are inexpensive and does not require complex mechanisms in ink jet printers. One problem with the bare solid ink bodies is, however, that the hands of the user are smeared with the pigment or dye when handling a bare solid ink body for supplying solid ink to an ink jet printer.

SUMMARY OF THE INVENTION

It is an object of the present invention to provide a solid ink for use in hot-melt ink jet printers which does not smear the hands of the user when it is supplied to the ink jet printer, and which further simplifies mechanisms in the ink jet printer.

According to the present invention, there is provided a solid ink for use in a hot-melt ink jet printer, the solid ink comprising: a central body including dye or pigment and wax; and a layer of wax formed on at least one surface of the central body.

According to another aspect of the present invention, in a solid ink, for use in a hot-melt ink jet printer, including dye or pigment and wax, with a ratio of an amount of the wax to that of the dye or pigment being in a predetermined range, the improvement is that the solid ink comprises a central body including wax and dye or pigment and a layer of wax disposed on at least one surface of the central body, and that a ratio of a total amount of the wax to an amount of the dye or pigment is in the predetermined range.

According to still another aspect of the present invention, a hot-melt ink jet printing apparatus comprises: means for supporting a solid ink, the solid ink comprising a central body including dye or pigment and wax and a layer of wax disposed on at least one surface of the central body, with a ratio of a total amount of the wax to an amount of the dye or pigment being in a predetermined range; means for heating the solid ink supported by the supporting means to melt the solid ink and mix the central body with the wax layer, to thereby form a fluid ink having the ratio of the wax to an amount of the dye or pigment in the predetermined range; and means for ejecting the fluid ink onto a support material to print information thereon.

Since the wax layer is disposed as an outer layer of the solid ink, the hands of the user are not smeared by the pigment or dye when the solid ink is manually placed in the ink supply system. When the solid ink is heated and melted into fluid ink in the ink supply system, the wax contained in the wax layer is mixed with the pigment or dye, making the density of the pigment or dye suitable for printing.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 5 and 6 show a method for producing the solid ink of the present invention, in which FIG. 5 is a perspective view showing a net box in which a plurality of central bodies are put, and FIG. 6 is a schematic view showing that the net box is immersed in a liquid of melted wax.

DETAILED DESCRIPTION OF THE PREFERRED EMBODIMENTS

Figure 1A:
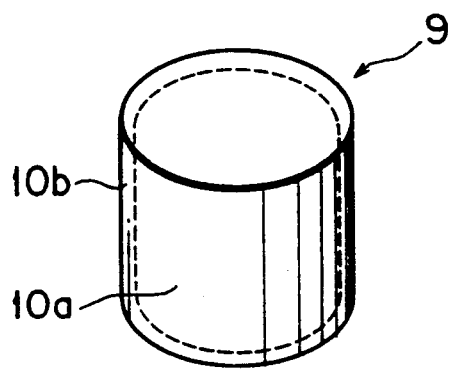
FIG. 1(A) is a perspective view of a solid ink according to the present invention.
Figure 1B:
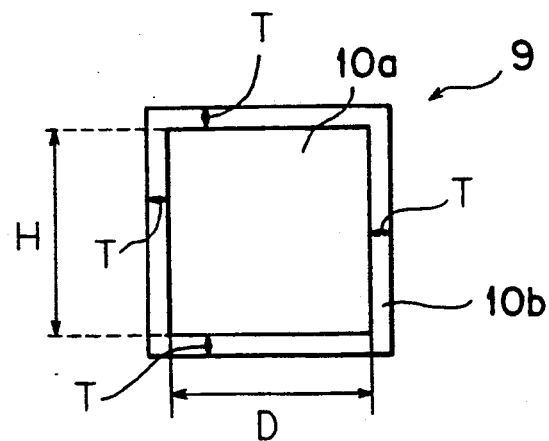
FIG. 1(B) is a side sectional view of the solid ink of FIG. 1(B)

FIGS. 1(A) and 1(B) show a solid ink according to the present invention. The solid ink, generally denoted at 9, is of a cylindrical shape and comprises a central cylindrical body 10a which mainly includes a dye or pigment and wax, and a tubular wax layer 10b which is disposed around the central body 10a and mainly includes wax. The wax contained in the central body 10a is of the same kind as that contained in the tubular wax layer 10b. The wax includes paraffin or microcrystalline wax. The amount of the wax contained in the central body 10a is slightly smaller than that of the wax contained in a usually used solid ink with no such wax layer. The dimension of the central body 10a, the amounts of the wax and the dye or pigment in the central body 10a and the thickness of the wax layer 10b are determined so that the ratio of the total amount of the wax both in the wax layer and in the the central body to the amount of the dye or pigment may be in a predetermined range which is suitable for hot-melt ink jet printing. That is, when the solid ink 9 is melted with heat into fluid ink, the central body 10a and the wax layer 10b are mixed together, making the total amount of the wax contained in the mixture suitable for printing, so that the density of the pigment or dye in the fluid ink is rendered suitable for printing. For the hot-melt ink jet printing performance, the melted fluid ink preferably has the pigment or dye with its density being in a range of 5 to 40 [weight%] and the wax with its density being in a range of 60 to 95 [weight%]. Therefore, for example, the tubular wax layer 10b has a wall thickness which preferably ranges from 0.1 to 0.2 millimeter, in the case where the central body 10b has a height H of 40 [mm]

and has bottom and top circular surfaces having diameters D of 35 [mm], as shown in FIG. 1(B).

One practical example of the solid ink 9 of the present invention will be described below. One example of the cylindrically-shaped central body 10a of the present invention has a height H of 40 [mm] and has bottom and top circular surfaces having diameters D of 35 [mm], as shown in FIG. 1(B). The density of the dye or pigment in the central body 10a is 20 [weight%], and the density of the wax in the central body is 80 [weight%]. Whole surfaces of the central body 10a are coated with a wax layer 10b having its thickness T of 0.2 [mm], as shown in FIG. 1(B). Kinds or types of the used dye or pigment and the wax are selected to be those having a specific gravity of 1, respectively. Therefore, the dye or pigment in the central body has a weight of about 7693 [g], and the wax in the central body has a weight of about 30772 [g]. On the other hand, the wax layer has a weight of about 1278 [g]. When the solid ink 9 shown in FIG. 1(B) is melted, the central body 10a and the wax layer 10b are melted to be mixed together, so that the total weight of the wax becomes 32050 [g]. As a result, the melted ink 9 has the density of the dye or pigment of about 19.4 [weight%] and the density of the wax of about 80.6 [weight%]. On the other hand, a solid ink for the hot-melt ink jet printer has preferably a density of the pigment or dye in a range of 5 to 40 [weight%] and a density of the wax in a range of 60 to 95 [weight%], in its melted state, as described already. Therefore, the solid ink 9 of this example of the invention has suitable densities of the pigment or dye and the wax, in the case where the solid ink is melted.

As apparent from the above-described example of the solid ink of the present invention, the dimensions of the central body 10a, the thickness of the wax layer 10b, the specific gravities of the wax and the dye or pigment and the densities of the dye or pigment and the wax in the central body 10a may be selected from various values so that the solid ink 9 may have such a dimension as suited to be received in a hot-melt ink jet printer but may have, in its melted state, such densities of the dye or pigment and the wax as fall within the above-mentioned ranges which are suited to the hot-melt ink jet printing.

A method of producing the solid ink 9 of the present invention will be described below, with reference to FIGS. 5 and 6.

Figure 5:
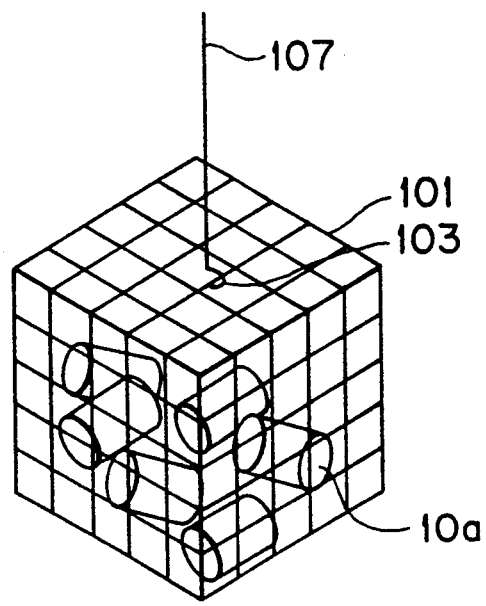
Figure 6:
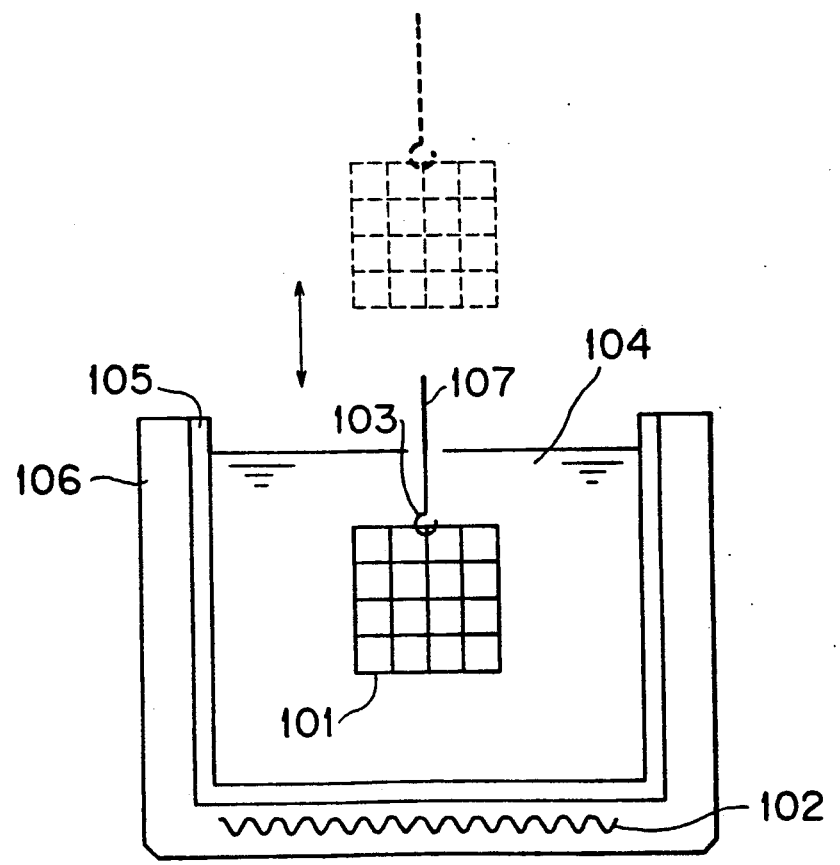

As shown in FIG. 5, a plurality of cynlindrical solid central members 10a made of mixture of wax and dye or pigment are put in a net box 101 formed of metal which is suspended at a hook 103 by a wire 107. The net box 101 is then immersed in liquid of melted wax 104 stored in a wax reservoir 105, as shown in FIG. 6. The wax reservoir 105 is surrounded by a heating member 106 which has, at its bottom portion, a heater 102. The heating member 106 heats the wax 104 inside the reservoir 105 to keep the wax 104 always melted. The net box 101 having therein the cylindrical members 10a is immersed for a predetermined period of time. Then, the net box 101 is lifted upwardly to be taken out of the liquid of melted wax 104. As a result, at normal temperature, the melted wax attached on the cylindrical members 10a is hardened, so that a wax layer 10b of a proper amount of thickness is formed around each of the solid members 10a. Thus, the solid ink 9 of the present invention shown in FIG. 1 is produced.

Figure 2:
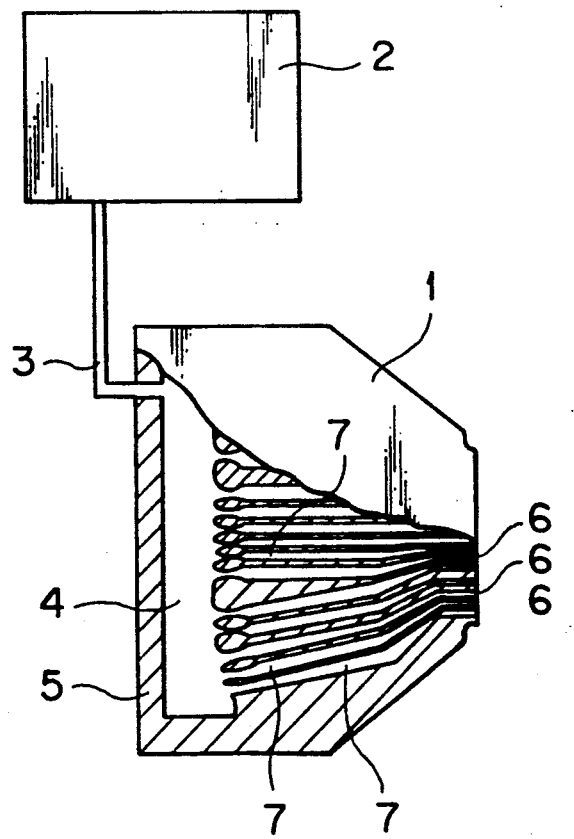
FIG. 2 is an elevational view, partly in cross section, of the ink jet print head of a hot-melt ink jet printer which uses the solid ink according to the present invention.

FIG. 2 shows the ink jet print head of a hot-melt ink jet printer. The ink jet print head, denoted at 1, has a head body 5 with an ink reservoir 4 defined in a rear portion thereof. The ink jet print head 1 is connected to an ink supply system 2 through a conduit 3. Ink is supplied from the ink supply system 2 through the conduit 3 into the ink reservoir 4.

The head body 5 has a vertical array of ink ejecting nozzle holes 6 defined therein and opening at a front surface remote from the ink reservoir 4. The ink ejecting nozzle holes 6 are held in communication with the ink reservoir 4 through respective ink chambers 7 defined in the head body 5. The ink chambers 7 house respective deflection plates (not shown) which can be electrically deflected to develop a pressure change in the ink chambers 7 for ejecting ink from the ink chambers 7 out of the nozzle holes 6 to print desired information on a sheet of print paper (not shown) positioned in front of the nozzle holes 6.

Figure 3:
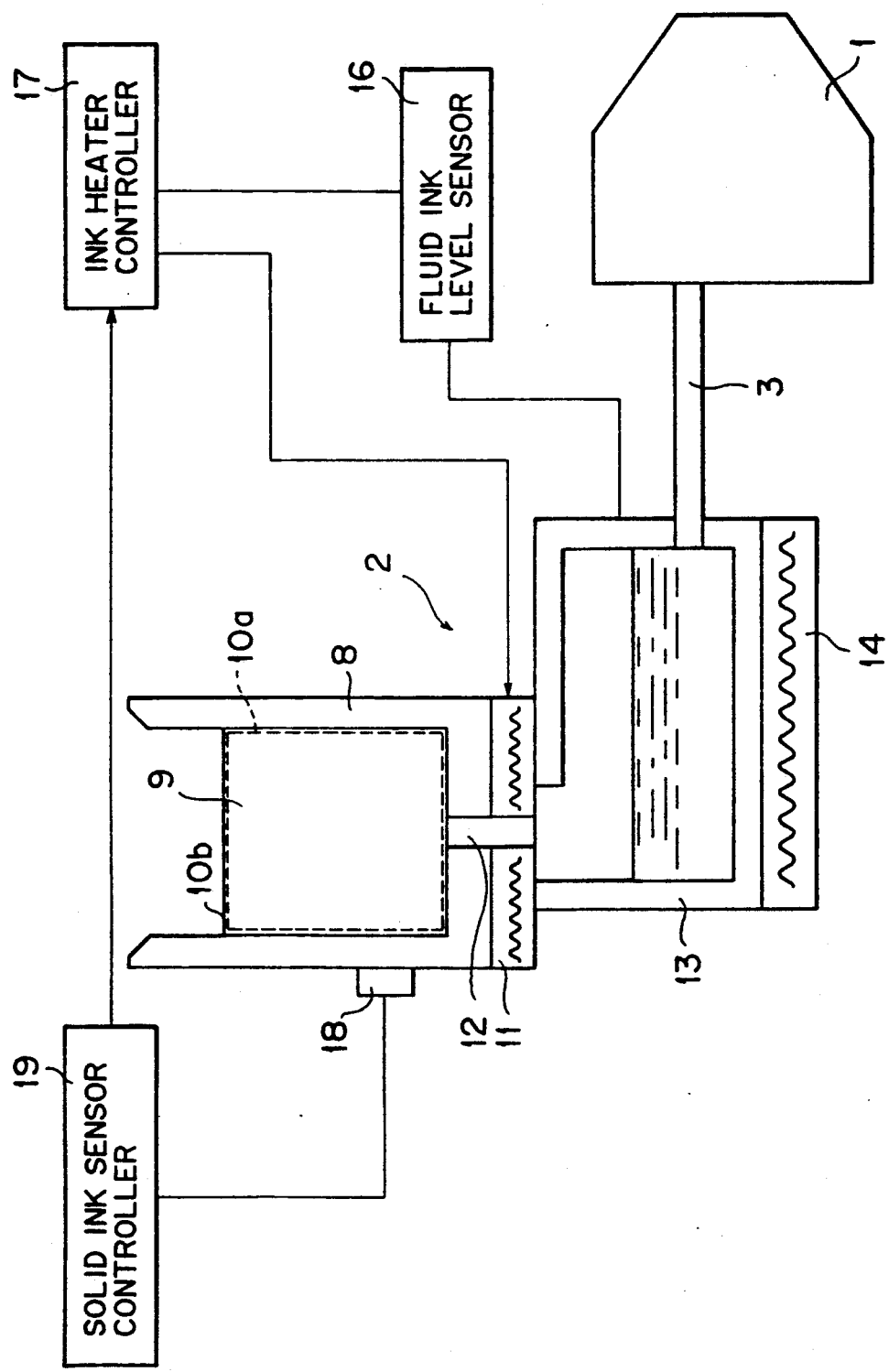
FIG. 3 is an elevational view, partly in block form, of an ink supply system for the print head of FIG. 2.

As shown in FIG. 3, the ink supply system 2 has a bottomed cylindrical ink case 8 of high thermal conductivity. The solid ink 9 which remains solid at normal temperature is held in the ink case 8. The ink case 8 has a heater 11 disposed in its bottom and energizable for heating the ink case 8 as a whole to melt the solid ink 9. The solid ink 9 when melted is turned into a fluid ink of suitable viscosity which is a mixture of the wax layer 10b and the central body 10a. The melted ink flows through a passage 12 defined in the bottom of the ink case 8 into an ink reservoir 13 which also has a heater 14 for keeping the ink in a fluid state. The fluid ink stored in the ink reservoir 13 is then supplied through a conduit 3 into the ink reservoir 4 in the ink jet print head 1.

The ink reservoir 13 is associated with a fluid ink level sensor 16 for detecting the amount of fluid ink in the ink reservoir 13. When the amount of fluid ink in the ink reservoir 13, as detected by the fluid ink level sensor 16, becomes less than a predetermined level, the fluid ink level sensor 16 applies a signal to a heater controller 17 which then energizes the heater 11 to melt the solid ink 9. Therefore, insofar as the amount of fluid ink in the reservoir 13 is greater than the predetermined level, the heater 11 is not energized and no fluid ink flows into the ink reservoir 13. Accordingly, the fluid ink in the ink reservoir 13 is always kept below the predetermined level. The ink case 8 is associated with a solid ink level sensor 18. When the amount of solid ink in the ink case 8, as detected by the solid ink level sensor 18, drops below a predetermined level, the solid ink level sensor 18 applies a signal to a solid ink sensor controller 19 which then applies a signal to the ink heater controller 17 not to energize the heater 11.

When the solid ink 9 in the ink case 8 is consumed, a new solid ink 9 is manually placed into the ink case 8 by the user. Since the central body 10a is covered with the wax layer 10b, the hands of the user are not smeared by the pigment or dye contained in the central body 10b.

Figure 4:
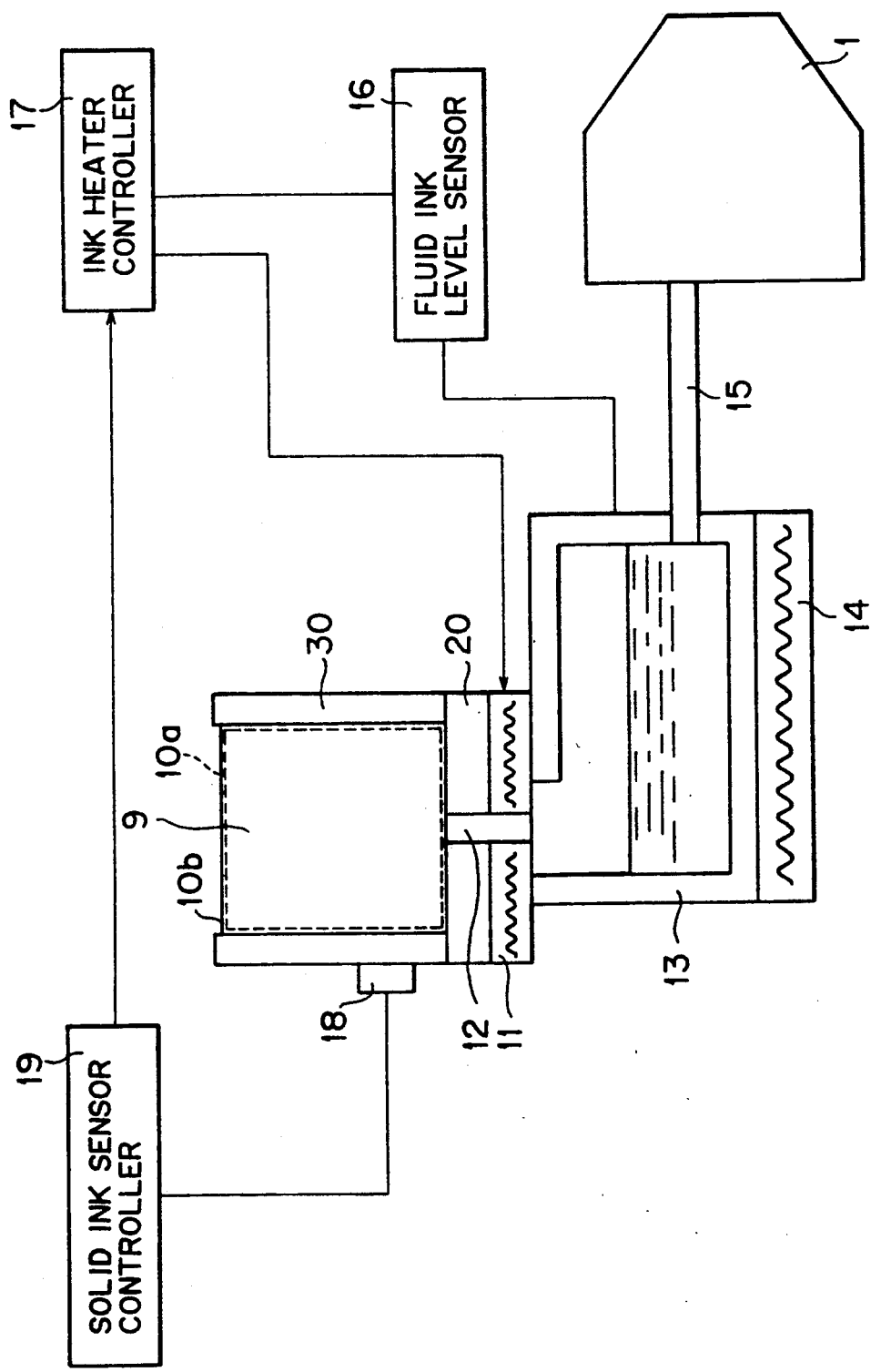
FIG. 4 is a view similar to FIG. 3, showing another ink supply system.

FIG. 4 shows another ink supply system for melting the solid ink 9 into fluid ink and supplying the fluid ink to the ink jet print head 1. Those parts shown in FIG. 4 which are identical to the ink supply system 2 shown in FIG. 3 are designated by identical reference numerals, and will not be described in detail. The ink supply system shown in FIG. 4 includes a bottomed cylindrical ink case 30 of low thermal conductivity. The solid ink 9 is axially slidably fitted in the ink case 30. The ink case 30 has a bottom of high thermal conductivity which is covered with a heating member 20 through which the passage 12 extends. The heating member 20 serves to support the solid ink 9 and also heat the solid ink 9 in combination with the heater 11. When the heater 11 is energized, the portion of the solid ink 9 which is held in contact with the heating member 20 is melted into fluid ink, which flows through the passage 12 into the ink reservoir 13. As the lower portion of the solid ink 9 is melted, the solid ink 9 moves downwardly along the inner wall surface of the ink case 30. Since the wax layer 10b of the solid ink 9 contacts the inner wall surface of the ink case 30, there is no large friction between the solid ink 9 and the ink case 30, allowing the solid ink 9 to move smoothly downwardly. As a consequence, the fluid ink is supplied highly reliably to the ink reservoir 13.

According to the present invention, as described above, when a new solid ink 9 is manually placed in the ink case 8 or 30, the hands of the user are not smeared by the pigment or dye of the solid ink 9. The amount of wax contained in the wax layer 10b is selected such that the density of the pigment or dye is suitable for printing when the central body 10a and the wax layer 10b are melted and mixed together. Consequently, the quality of printed information is not lowered by the use of the solid ink 9. The solid ink 9 does not require complex mechanisms in the hot-melt ink jet printer.

Although a certain preferred embodiment has been shown and described, it should be understood that many changes and modifications may be made therein without departing from the scope of the appended claims. For example, according to the present invention, only one or two surfaces of the central body 10a may be coated with the wax layer 10b, in order to prevent the hands of the user from being smeared with the dye or pigment.

What is claimed is:

1. A solid ink for use in a hot-melt ink jet printer, the ink jet printer heating said solid ink to be melted into a fluid ink formed of a mixture of wax and dye or pigment and ejecting the fluid ink onto a printing medium. said solid ink comprising:
   a central body including wax and the dye or pigment, said central body having an outer surface; and
   a layer of wax formed on at least one portion of the outer surface of said central body for covering the dye or pigment exposed on the outer surface of said central body to thereby prevent hands of an operator from being smeared with the dye or pigment, said central body and said wax layer being mixed together when said solid ink is heated and melted so that the dye or pigment in said central body, the wax in said central body and the wax in said wax layer are mixed together into the fluid ink.

2. The solid ink according to claim 1, wherein said central body comprises a cylindrical central body and said wax layer comprises a tubular wax layer surrounding said cylindrical central body.

3. The solid ink according to claim 1, wherein a ratio of a total amount of the wax both included in said central body and included in said wax layer with respect to an amount of the dye or pigment included in said central body is selected such that a density of the wax in the fluid ink falls in a range of 60 to 95 weight percent.

4. The solid ink according to claim 3, wherein a ratio of an amount of the dye or pigment included in said central body with respect to a total amount of the wax both included in said central body and included in said wax layer is selected such that a density of the dye or pigment in the fluid ink falls in a range of 5 to 40 weight percent.

5. The solid ink according to claim 4, wherein said wax layer is formed on all the portions of the outer surface of said body.

* * * * *